3,350,316
ANTIFREEZE COMPOSITION
Bernard H. Berger and Paul M. Kerschner, Trenton, N.J., assignors to Cities Service Oil Company, Bartlesville, Okla., a corporation of Delaware
No Drawing. Filed Apr. 6, 1965, Ser. No. 446,101
11 Claims. (Cl. 252—75)

ABSTRACT OF THE DISCLOSURE

A concentrated antifreeze composition consisting substantially of a water soluble alcohol or glycol, preferably either methanol or ethylene glycol, respectively, and an additive which is the reaction product of phosphoric acid, boric acid and alkanol amines having the formula:

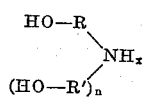

wherein $n$ equals 0 or 1, $x$ equals 2 when $n$ equals 0, $x$ equals 1 when $n$ equals 1 and each R and R′ represents a radical selected from the group consisting of alkyl hydrocarbon radicals and alkyl ether radicals and has from 2 to about 12 carbon atoms in the longest chain. In the case of alkyl hydrocarbon radicals, those radicals having from 2 to 4 carbon atoms in the longest chain are preferred.

The reaction product additive is included in the amount of from about 1 to about 5% by weight of the concentrated antifreeze solution. Additionally, an alkali metal mercaptobenzothiazole in the amount of from about 0.1 to about 1.0% by weight of the total antifreeze composition and other additives such as antifoam agents, dyes and other special purpose additives may be included in the antifreeze composition.

---

This invention relates to new compositions of matter and to improved antifreeze compositions containing the same which are especially adaptable for use in cooling systems in internal combustion engines.

Antifreeze compositions comprising aqueous solutions of water soluble alcohols are commonly employed in the cooling systems of internal combustion engines to prevent freezing of the cooling medium during periods of cold weather. These compositions are used in systems in which they are in contact with different metals and with combinations of metals such as steel, iron, copper, aluminum, etc. Corrosion of metals in the system is frequently aggravated by electrolytic effects caused by contacting the antifreeze composition with the various metals used in the system. The presence of various metals in the system also complicates the problem of finding a suitable antifreeze composition since agents which are effective to inhibit corrosion of particular metals are frequently corrosive to other metals. Since antifreeze compositions must be formulated for use with systems containing different metals, it is, therefore, frequently necessary to employ various inhibitors in the antifreeze compositions. The problem is further complicated by the fact that the presence of one corrosion inhibitor may adversely affect the performance of other corrosion inhibitors in the same solution. It is, therefore, a matter of some importance to formulate antifreeze solutions containing the correct combinations of ingredients to insure proper protection against corrosion of the various metals commonly found in cooling systems.

With the increasing use of aluminum parts in internal combustion engines and especially in automobile engines, one of the most urgent problems facing suppliers and users of antifreeze at the present time is the need for antifreeze compositions which can be used in contact with aluminum as well as with other metals such as steel, cast iron, etc. Unfortunately, previously available antifreeze compositions are frequently strongly corrosive with respect to aluminum.

Since most anitfreeze solutions are distributed in concentrated form and diluted with water only when placed into actual use in the cooling system of an internal combustion engine, the effects of the antifreeze solution on metal storage containers must also be considered. Unfortunately, many antifreeze solutions which provide adequate protection against corrosion when diluted with water do not provide sufficient protection against corrosion of metal containers during storage in concentrated form. This breakdown of the antifreeze composition during storage is especially noticeable in the case of ethylene glycol antifreezes.

It is an object of this invention to provide new compositions of matter useful in the formulation of antifreeze compositions.

It is another object of the invention to provide antifreeze compositions having improved resistance to corrosion.

The new compositions of matter of the present invention are the reaction products of phosphoric acid, boric acid and alkanol amines having the formula:

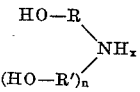

wherein $n$ equals 0 or 1, $x$ equals 2 when $n$ equals 0, $x$ equals 1 when $n$ equals 1 and each of R and R′ represents a radical selected from the group consisting of alkyl hydrocarbon radicals and alkyl ether radicals and has from 2 to about 12 carbon atoms in the longest chain. In the case of alkyl hydrocarbon radicals, those radicals having from 2 to 4 carbon atoms in the longest chain are preferred.

While the exact identity of such reaction products has not been ascertained, the general reaction mechanism is believed to be as follows when a mono-alkanol amine is used:

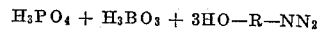

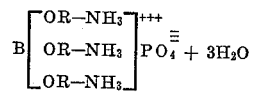

Likewise, when a dialkanol amine is used the reaction mechanism is believed to be as follows:

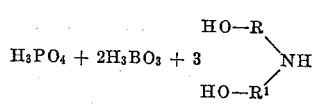

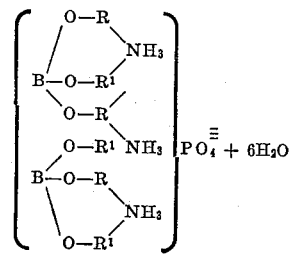

While the above equations are believed to represent the general reaction mechanism and primary products, it is quite possible that other products are formed. For instance, in the case of a reaction involving a mono-alkanol amine, other possibilities include:

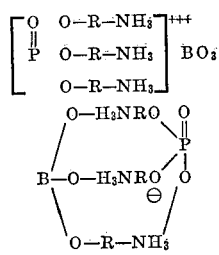

The reaction product of the present invention may be formed in any suitable manner such as by mixing suitable quantities of the starting ingredients together and maintaining them under temperatures of at least about 100° C. for a period of at least about 1 hour. Preferably temperatures are maintained by refluxing in the range between about 100 and about 120° C. and the reaction is allowed to take place for a period between about 1 and about 8 hours. To facilitate the reaction, a suitable solvent may be used in sufficient amounts to insure that all reactants are soluble at reaction conditions. Solvent may be removed following the reaction by suitable means such as distillation.

Typical examples of preparation of novel reaction products of the present invention are as follows:

Example 1

11.5 grams of an 85 weight percent (wt. percent) aqueous solution of phosphoric acid, 6.2 grams of boric acid, 73.2 grams (gm.) of ethanol amine and 85 cubic centimeters (cc.) of water were placed in a one liter, 3-neck flask equipped with a mechanical stirrer, thermometer and reflux condenser. The system was heated to refluxing temperature of 110° C. and the reaction was carried out at this temperature for a period of 7 hours. The reaction system was then allowed to come to room temperature and the water and excess ethanol amine were removed by distilling at reduced pressure. 34.2 grams of a white crystalline solid was recovered. For ease of handling, the solid material was dissolved in a known quantity of 10% product and 90% ethylene glycol.

In a like manner, various other reaction products of the present invention may be prepared using the following starting materials:

Example 2

| | | |
|---|---|---|
| Boric acid (0.2 mol) | gm | 12.4 |
| H$_3$PO$_4$ (85%) (0.1 mol) | gm | 11.5 |
| Diethanol amine (0.6 mol) | gm | 63.0 |
| H$_2$O | cc | 100 |

Example 3

| | | |
|---|---|---|
| Boric acid (0.2 mol) | gm | 12.4 |
| H$_3$PO$_4$ (85%) (0.1 mol) | gm | 11.5 |
| Dipropanol amine (0.6 mol) | gm | 79.8 |
| H$_2$O | cc | 100 |

Example 4

| | | |
|---|---|---|
| Boric acid (0.1 mol) | gm | 6.2 |
| H$_3$PO$_4$ (85%) (0.1 mol) | gm | 11.5 |
| Poly glycol amine | gm | 97.8 |

[HOCH$_2$CH$_2$OCH$_2$CH$_2$NH$_2$]

| | | |
|---|---|---|
| H$_2$O | cc | 150 |

Example 5

| | | |
|---|---|---|
| Boric acid | gm | 6.2 |
| Phosphoric acid (85%) | gm | 11.5 |
| Isopropanol amine | gm | 67.5 |
| H$_2$O | cc | 150 |

Example 6

| | | |
|---|---|---|
| Boric acid | gm | 12.4 |
| Phosphoric acid (85%) | gm | 11.5 |
| Diisopropanol amine | gm | 79.8 |
| H$_2$O | cc | 150 |

Example 7

| | | |
|---|---|---|
| Boric acid (0.2 mol) | gm | 12.4 |
| H$_3$PO$_4$ (85%) (0.1 mol) | gm | 11.5 |
| Isobutanol amine (0.6 mol) | gm | 96.6 |
| H$_2$O | cc | 150 |

Example 8

| | | |
|---|---|---|
| Boric acid (0.2 mol) | gm | 12.4 |
| H$_3$PO$_4$ (85%) (0.1 mol) | gm | 11.5 |
| Monoethanol-monoisobutanol-amine | gm | 79.8 |

Example 9

| | | |
|---|---|---|
| Boric acid | gm | 6.2 |
| H$_3$PO$_4$ (85%) | gm | 11.5 |
| Ethanol, isopropanol amine | gm | 103.8 |

Example 10

| | | |
|---|---|---|
| Boric acid | gm | 12.4 |
| H$_3$PO$_4$ (85%) | gm | 11.5 |
| Decanol amine | gm | 108.5 |

Example 11

| | | |
|---|---|---|
| Boric acid | gm | 12.4 |
| H$_3$PO$_4$ (85%) | gm | 11.5 |
| Alkanol amine | gm | 99.0 |

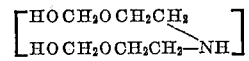

Example 12

| | | |
|---|---|---|
| Boric acid | gm | 12.4 |
| H$_3$PO$_4$ (85%) | gm | 11.5 |
| Dihexanol amine | gm | 130.2 |

Example 13

| | | |
|---|---|---|
| Boric acid | gm | 6.2 |
| H$_3$PO$_4$ (85%) | gm | 11.5 |
| Alkanol amine | gm | 168.6 |

[HOCH$_2$CH$_2$(OCH$_2$CH$_2$)$_5$NH$_2$]

When the reaction products of the present invention are utilized in antifreeze compositions, the non-aqueous portion of the antifreeze composition comprises between about 1 and about 5 wt. percent of such reaction product, between about 90 and about 99 wt. percent of a water soluble alcohol selected from the group consisting of low molecular weight monohydroxy aliphatic alcohols and low molecular weight dihydroxy aliphatic alcohols and between about 0.1 and about 1.0 wt. percent of an alkali metal mercaptobenzothiazole.

Alcohols suitable for use in antifreeze compositions of the present invention include monohydroxy and dihydroxy aliphatic alcohols of low molecular weight and are preferably present in amounts between about 90 and about 99 weight percent of the total antifreeze composition. Suitable monohydroxy alcohols preferably contain 1 to 6 carbon atoms and include, for example methanol, ethanol, propanol, etc., while suitable dihydroxy alcohols preferably contain 2 to 6 carbon atoms and include, for instance, ethylene glycol or propylene glycol. Mixtures of suitable monohydroxy alcohols or dihydroxy alcohols may also be used. Monohydroxy alcohols are commonly used in the preparation of volatile antifreeze compositions while dihydroxy alcohols are commonly used in the preparation of non-volatile or permanent type antifreeze compositions. While a variety of alcohols are suitable for use in antifreeze compositions of the present invention as described above, ethylene glycol is preferred for use in non-volatile type antifreeze compositions while methanol is preferred for use in volatile type antifreeze compositions.

The antifreeze compositions described herein are concentrated compositions containing only a minimum amount of water or other diluent and it is contemplated that such compositions will usually be diluted prior to use. While the antifreeze compositions of the present invention are intended primarily for use in the cooling system of internal combustion engines, they may be utilized in a number of different fields in which dilute solutions are used under conditions where temperatures may range below the freezing point of the diluent. When used in cooling systems, the antifreeze compositions described herein are usually diluted with water to obtain a solution containing between about 10 and about 70 volume percent of the antifreeze composition, but solutions containing other proportions of the antifreeze compositions are within the scope of the invention.

A preferred alkali metal mercaptobenzothiazole for use in antifreeze compositions of the present invention is sodium mercaptobenzothiazole while other alkali metal mercaptobenzothiazoles, such as potassium mercaptobenzothiazole, may be used. The alkali metal mercaptobenzothiazole salt is preferably present in amounts between about 0.1 and about 1.0 wt. percent of the total antifreeze composition and may conveniently be added to the composition as an aqueous solution of suitable strength, such as for example, a 50 wt. percent solution.

The ingredients incorporated in antifreeze compositions of the present invention may be mixed in any suitable manner. For instance, normally solid ingredients may be dissolved directly in all or a portion of the liquid components of the composition. Normally solid ingredients may also be dissolved in small amounts of suitable solvents such as water or alcohol and the resulting solutions may be used in formulating the antifreeze compositions.

Since the usual commercial practice is to distribute antifreeze compositions in concentrated form for dilution with water immediately prior to use, it is usually desirable to use as little water or other solvent or diluent as possible in formulating antifreeze compositions since additional diluent merely increases the quantity of solution which must be transported and stored prior to use. It is frequently desirable, however, to use small amounts of water to aid in mixing the various ingredients of the above described antifreeze compositions. Also, small amounts of water are frequently present in commercial alcohols such as ethylene glycol. Water is, therefore, frequently present in antifreeze compositions of the present invention in quantities between about 1.0 and about 10.0 weight percent of the antifreeze composition and larger amounts of water may, of course, be present after such composition has been diluted for use or if such composition is deliberately prepared with additional water.

In addition to the ingredients described above, antifreeze compositions of the present invention may include small amounts of other ingredients such as antifoam agents, dyes for imparting desired color properties or other special purpose additives. Suitable antifoam agents may include, for example, commercial silicon emulsions as well as polyglycol antifoam agents. A suitable polyglycol antifoam agent is, for instance, a polypropylene glycol having a molecular weight of about 1200. Both silicon and polyglycol antifoam agents may be used separately or together in suitable amounts. For instance, where a silicon antifoam agent is used, it is frequently present in amounts between about 0.001 and about 0.01 weight percent of the antifreeze composition while polyglycol antifoam agents when used are frequently present in amounts between about 0.05 and about 0.2 weight percent of the total antifreeze composition. If special color properties are desired in the finished antifreeze composition, suitable color dyes may be used and such dyes are frequently present in amounts between about 0.0005 and about 0.05 weight percent of the antifreeze composition.

Other suitable additives include, for instance, alkali metal arsenites, such as sodium or potassium arsenite and alkali metal metaborates such as sodium or potassium metaborate. Such arsenites and metaborates may be present in suitable quantities such as between about 0.2 and about 2.0 wt. percent of the antifreeze composition.

Many various antifreeze compositions may, of course, be formulated in accordance with the present invention and the compositions described below are merely indicative of the various types of antifreeze compositions contemplated by the invention. The following compositions illustrate by way of example antifreeze compositions which may be formulated in accordance with the invention. In each case the amount of each ingredient is expressed as a weight percent of the total composition.

*Example 14*

A suitable antifreeze composition of the present invention which is effective in resisting corrosion of various metals may for example contain the following ingredients expressed as wt. percent of the total antifreeze composition exclusive of additional water or other diluent which may be added at the time of formulation or subsequently.

| Ingredients: | Weight percent |
|---|---|
| Ethylene glycol | 95.02 |
| Water | 1.75 |
| Sodium mercaptobenzothiazole | 0.15 |
| Reaction product of Example 1 | 3.0 |
| Polyglycol antifoam agent (molecular weight 1200) | 0.075 |
| Green dye | 0.005 |

*Example 15*

Another suitable antifreeze composition may contain the following ingredients:

| Ingredients: | Weight percent |
|---|---|
| Ethylene glycol | 95.26 |
| Water | 1.49 |
| Sodium mercaptobenzothiazole | 0.17 |
| Reaction product of Example 4 | 3.0 |
| Polyglycol antifoam agent (molecular weight 1200) | 0.075 |
| Green dye | 0.005 |

*Example 16*

Another suitable antifreeze composition in accordance with the invention contains the following ingredients:

| Ingredients: | Weight percent |
|---|---|
| Ethylene glycol | 95.34 |
| Water | 1.41 |
| Sodium mercaptobenzothiazole | 0.17 |
| Reaction product of Example 2 | 3.0 |
| Polyglycol antifoam agent (molecular weight 1200) | 0.075 |
| Green dye | 0.005 |

*Example 17*

Another suitable antifreeze composition includes the following ingredients:

| Ingredients: | Weight percent |
|---|---|
| Ethylene glycol | 90.0 |
| Water | 8.0 |
| Sodium mercaptobenzothiazole | 1.0 |
| Reaction product of Example 13 | 1.0 |

*Example 18*

Another suitable antifreeze composition contains:

| Ingredients: | Weight percent |
|---|---|
| Methanol | 90.9 |
| Water | 4.0 |
| Potassium mercaptobenzothiazole | 0.1 |
| Reaction product of Example 12 | 5.0 |

Example 19

Another suitable antifreeze composition contains:

| Ingredients: | Weight percent |
|---|---|
| Propylene glycol | 94.0 |
| Water | 2.7 |
| Potassium arsenite | 0.5 |
| Sodium metaborate | 1.1 |
| Sodium mercaptobenzothiazole | 0.2 |
| Reaction product of Example 8 | 1.5 |

Example 20

Another suitable antifreeze composition includes:

| Ingredients: | Weight percent |
|---|---|
| Ethanol | 93.0 |
| Water | 3.1 |
| Sodium mercaptobenzothiazole | 0.4 |
| Reaction product of Example 11 | 3.5 |

To test the effectiveness of antifreeze compositions of the present invention in resisting corrosion of various types of metals, the antifreeze compositions described in Examples 14, 15 and 16 above were formulated and tested as indicated below. Antifreeze compositions including reaction products of the general type of the present invention but utilizing tri-alkanol amine rather than mono- or dialkanol amine were also formulated and tested as indicated below:

The corrosion effects of these antifreeze compositions were tested with respect to steel, copper, brass, solder, cast aluminum and cast iron by the use of the ASTM glassware corrosion test D-1384 as modified by General Motors Specification 1899M dated August 1957. In this test, 1 by 2 inch specimens of the various metals used are uniformly cleaned, polished, weighed and bolted together on an insulated rod with ¼ inch spacers between the specimens. The spacers are made from one of the two adjoining metal specimens except that a non-conducting material is used between brass and steel. The cast iron, cast aluminum and solder specimens are ⅛ inch thick while the steel, copper and brass specimens are 1/16 inch thick. The steel specimen is SAE 1020 cold rolled steel. The specimen bundle is placed in a 1 liter tall form beaker with 250 milliliters of the antifreeze composition being tested and 750 milliliters of synthetic hard water standardized to contain 300 parts per million (p.p.m.) of sulfate ion and 100 p.p.m. chloride ion (sodium salt in both cases). The beaker is fitted with a gas dispersion tube which extends to the bottom of the beaker. The solution is maintained at 160° F. and the aeration rate is set at 100 milliliters per minute. After 336 hours the specimens are removed from the solution, examined visually, cleaned free of corrosion products, dried and weighed. Corrosion losses are reported as milligrams per specimen. Corrosion test results of the antifreeze compositions of Table I are shown in Table II below:

TABLE II.—RESULTS OF CORROSION TESTS

| Antifreeze Formation | Alkanol Amine used in preparation | Specimen Weight Loss (mg.) | | | | | Cast Aluminum | |
|---|---|---|---|---|---|---|---|---|
| | | Copper | Solder | Bran | Steel | Cast Iron | Pre-clean | Post-clean |
| A | Ethanol Amine | 2.2 | 6.8 | 2.9 | 1.8 | 1.0 | 0.6 | 4.9 |
| B | HOCH₂CH₂(OCH₂CH₂)NH₂ | 3.2 | 3.4 | 8.6 | 4.7 | 2.9 | 0.0 | 5.7 |
| C | Diethanol Amine | 2.2 | 5.2 | 2.5 | 12.0 | 12.3 | 0.8 | 4.2 |
| D | Triisopropanol Amine | 16.8 | 36.6 | 62.2 | 2,778.5 | 3,414.5 | 141.7 | 176.5 |
| E | Triethanol Amine | 0.5 | 5.3 | 0.9 | 18.9 | 234.5 | 36.8 | 16.2 |
| F | None | 3.8 | 3.5 | 10.3 | 107.2 | 401.7 | 0.1 | 26.5 |

The various antifreeze compositions tested had the compositions indicated in Table I below:

TABLE I.—ANTIFREEZE COMPOSITIONS

| Ingredients: | Wt. Percent Formulation No. | | | | | |
|---|---|---|---|---|---|---|
| | A | B | C | D | E | F |
| Ethylene glycol | 95.02 | 95.26 | 95.34 | 95.26 | 95.76 | 98.1 |
| Water | 1.75 | 1.49 | 1.49 | 1.49 | 1.49 | 1.59 |
| Sodium Mercaptobenzothiazole | 0.15 | 0.17 | 0.17 | 0.17 | 0.17 | 0.23 |
| Polyglycol antifoam agent (molecular weight 1,200) | 0.075 | 0.075 | 0.075 | 0.075 | 0.075 | 0.075 |
| Green dye | 0.005 | 0.005 | 0.005 | 0.005 | 0.005 | 0.005 |
| Reaction product of H₃BO₃, H₃PO₄ and ethanol amine | 3.0 | | | | | |
| Reaction product of H₃BO₃, H₃PO₄ and diethanol amine | | | 3.0 | | | |
| Reaction product of H₃BO₃, H₃PO₄ and HOCH₂CH₂(OCH₂CH₂)NH₂ | | 3.0 | | | | |
| Reaction product of H₃BO₃, H₃PO₄ and triisopropanol amine | | | | 3.0 | | |
| Reaction product of H₃BO₃, H₃PO₄ and triethanol amine | | | | | 1.5 | |

To further test the effectiveness of the antifreeze compositions of the present invention in comparison with other antifreeze compositions, several commercial antifreezes obtained on the open market and designated below as antifreeze compositions D, E, F and G were also subjected to the glassware corrosion test described above.

The results of these tests are shown in Table III below.

TABLE III.—GLASSWARE CORROSION TEST RESULTS FOR COMMERCIAL ANTIFREEZES

| Weight loss per Specimen (mg.) | Antifreeze Composition | | | |
|---|---|---|---|---|
| | D | E | F | G |
| Copper | 13.3 | 7.5 | | 12.2 |
| Brass | 16.4 | 8.2 | | 54.1 |
| Solder | 21.5 | 13.3 | 25.5 | 9.5 |
| Cast aluminum preclean [a] | 6.2 | 15.4 | 57.2 | 10.5 |
| Cast aluminum postclean [b] | 45.7 | 88.5 | 7.7 | 39.5 |
| Steel | 10.0 | 2.5 | 41.4 | 165.4 |
| Cast Iron | 116.0 | 0.4 | 497.2 | 106.8 |
| | | | 258.5 | |
| Total weight loss (mg.) | 229.1 | 135.8 | 887.5 | 398.0 |

[a] Wiped clean with acetone.
[b] Immersed in 5% phosphoric acid and 2% chromic acid for 5 minutes at 175° F.

The above data shows conclusively the superior nature of antifreeze compositions of the present invention as opposed to the commercially available antifreezes. The data further indicates the critical nature of the reaction products of the present invention in such antifreeze compositions by showing that the superior results obtained when using reaction products of the invention are not obtained when the reaction product is varied even slightly as by the substitution of a tri-alkanol amine in the original starting materials.

While the invention has been described above with respect to certain preferred embodiments thereof, it will be understood by those skilled in the art that various changes and modifications may be made without departing from the spirit and scope of the invention and it is intended to cover all such changes and modifications in the appended claims.

We claim:
1. An antifreeze composition, consisting essentially of between about 90 and about 99 wt. percent of water soluble alcohol selected from the group consisting of low molecular weight monohydroxy alcohols and low molecular weight dihydroxy alcohols and which contains between about 0.1 and about 1.0 wt. percent alkali metal mercaptobenzothiazole and between about 1 and about 5 wt. percent reaction product of reacting together for a period of at least one hour at temperatures of at least about 100° C. boric acid, phosphoric acid and an alkanol amine in the ratio of from one to two moles boric acid to one mole phosphoric acid to three moles alkanol amine having the formula

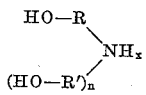

wherein $n=0$ or 1, $x=2$ when $n=0$, $x=1$ when $n=1$ and each of R and R′ represents a radical selected from the group consisting of alkyl hydrocarbon radicals and alkyl ether radicals and has from 2 to about 12 carbon atoms in the longest chain.

2. A non-volatile type antifreeze composition consisting essentially of between about 90 and about 99 wt. percent ethylene glycol, between about 1 and about 10 wt. percent water, between about 0.1 and about 1.0 wt. percent alkali metal mercaptobenzothiazole and between about 1 and about 5 wt. percent reaction product of reacting together for a period of at least one hour under temperatures of at least about 100° C. boric acid, phosphoric acid and an alkanol amine in the ratio of from one to two moles boric acid to one mole phosphoric acid to three moles alkanol amine having the formula

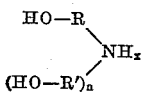

wherein $n=0$ or 1, $x=2$ when $n=0$, $x=1$ when $n=1$ and each of R and R′ represents a radical selected from the group consisting of alkyl hydrocarbon radicals and alkyl ether radicals and has from 2 to about 12 carbon atoms in the longest chain.

3. An antifreeze composition according to claim 2 wherein R and R′ each represents an alkyl hydrocarbon radical.

4. An antifreeze composition according to claim 2 wherein R and R′ each represents an alkyl hydrocarbon radical having from 2 to 4 carbon atoms in the longest chain.

5. An antifreeze composition according to claim 2 wherein at least one of R and R′ represents an alkyl ether radical.

6. An antifreeze composition according to claim 2 wherein the alkanol amine is ethanol amine.

7. An antifreeze composition according to claim 2 wherein the alkanol amine is diethanol amine.

8. An antifreeze composition according to claim 2 wherein the alkanol amine has the formula $$HOCH_2CH_2OCH_2CH_2NH_2$$

9. A non-volatile antifreeze composition consisting essentially of:
 (a) ethylene glycol in the amount of from about 90% to about 99% by weight;
 (b) water in the amount of from about 1% to about 10% by weight of the composition;
 (c) an alkali metal mercaptobenzothiazole in the amount of from about 0.1% to about 1.0% by weight of the composition; and
 (d) between about 1% and about 5% of a reaction product of the process comprising the steps of:
  (1) providing phosphoric acid, boric acid, and alkanol amines having the formula:

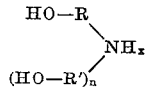

wherein $n$ equals 0 or 1, $x$ equals 1 when $n$ equals 1 and each of R and R′ represent a radical selected from the group consisting of alkyl hydrocarbon radicals and alkyl ether radicals and has from 2 to about 12 carbon atoms in the longest chain;
  (2) reacting the phosphoric acid, the boric acid, and the alkanolamine in the ratio of from one to two moles boric acid, one mole phosphoric acid to three moles of the alkanolamine at a temperature of at least about 100° C. for a period of at least about 1 hour to obtain the reaction product.

10. The composition of claim 9 wherein the step of simultaneously maintaining the mixture at a temperature of at least about 100° C. comprises maintaining the temperature between about 100° C. and about 120° C. for a period of between about 1 hour and about 8 hours.

11. The composition of claim 9 wherein the reaction product process additionally comprises the steps of:
 (a) mixing the phosphoric acid, the boric acid and the alkanol amine in water; and
 (b) removing the water and any excess alkanol amine at the end of the reaction.

References Cited

UNITED STATES PATENTS 3,046,230  7/1962  Berger _____ 252—75

LEON D. ROSDOL, *Primary Examiner.*

S. D. SCHWARTZ, *Assistant Examiner.*